United States Patent
Tasaka et al.

(10) Patent No.: US 8,190,563 B2
(45) Date of Patent: May 29, 2012

(54) DOCUMENT MANAGEMENT APPARATUS, DOCUMENT MANAGEMENT METHOD, AND COMPUTER-READABLE ENCODING MEDIUM RECORDED WITH A COMPUTER PROGRAM

(75) Inventors: Masaki Tasaka, Tokyo (JP); Seiji Takahashi, Tokyo (JP); Hiroshi Ota, Saitama (JP); Yuichiro Sakuta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 484 days.

(21) Appl. No.: 12/426,413

(22) Filed: Apr. 20, 2009

(65) Prior Publication Data

US 2009/0271452 A1    Oct. 29, 2009

(30) Foreign Application Priority Data

Apr. 24, 2008  (JP) ................................. 2008-114156

(51) Int. Cl.
 *G06F 7/00* (2006.01)
(52) U.S. Cl. ....................................................... 707/610
(58) Field of Classification Search .................. 707/609, 707/610, 638
See application file for complete search history.

(56) References Cited

U.S. PATENT DOCUMENTS

| | | | | |
|---|---|---|---|---|
| 2005/0171947 | A1* | 8/2005 | Gautestad | 707/5 |
| 2007/0250602 | A1* | 10/2007 | Bodin et al. | 709/219 |
| 2009/0037820 | A1* | 2/2009 | Bodin et al. | 715/730 |
| 2011/0197186 | A1* | 8/2011 | Barker et al. | 717/168 |

FOREIGN PATENT DOCUMENTS

JP   11-25113   1/1999

* cited by examiner

*Primary Examiner* — Angela Lie
(74) *Attorney, Agent, or Firm* — Oblon, Spivak, McClelland, Maier & Neustadt, L.L.P.

(57) ABSTRACT

A document management apparatus is disclosed. Document storing instruction information is acquired to instruct to store a second document information including a second information element, which is generated by copying a first information element included in a first document information. The second information element included in the second document information is acquired based on the acquired document storing instruction information. Then, it is instructed to store the second information element. Next, copy originator information concerning the first information element, which is included in the document storing instruction information and is a copy originator of the second information element, is acquired. Then, it is instructed to store association information for associating the second information element with the first information element based on the acquired copy originator information.

12 Claims, 22 Drawing Sheets

FIG.4

| INFORMATION ELEMENT ID | DOCUMENT ID | PAGE | DISPLAY AREA | COUNT | COPY ID | TYPE | ... |
|---|---|---|---|---|---|---|---|
| A-1-1 | A | A-1 | $X_1,Y_1 - X_2,Y_2$ | 1000 | 0001 | ORIGINAL | |
| A-1-2 | A | A-1 | $X_1,Y_1 - X_2,Y_2$ | 0000 | 0002 | ORIGINAL | |
| A-2-1 | A | A-2 | $X_1,Y_1 - X_2,Y_2$ | 0500 | 0003 | ORIGINAL | |
| ... | | | | | | | |

FIG.9

```
DOCUMENT ID          : B
PAGE                 : 2
DISPLAY AREA         : X1,Y1 - X2,Y2
COPY ORIGINATOR IMAGE: A-1-2
COPY TYPE            : COPY & REDUCTION

```
DOCUMENT ID          : B
PAGE                 : 2
DISPLAY AREA         : X1,Y1 - X2,Y2
INFORMATION ELEMENT ID : B-2-4

| | |
|---|---|
| INFORMATION ELEMENT ID | : B-2-4 |
| DOCUMENT ID | : B |
| PAGE | : 2 |
| DISPLAY AREA | : $X_1,Y_1 - X_2,Y_2$ |
| COPY ID | : 0002 |
| COPY TYPE | : COPY & REDUCTION |

| INFORMATION ELEMENT ID | DOCUMENT ID | PAGE | DISPLAY AREA | COUNT | COPY ID | TYPE |
|---|---|---|---|---|---|---|
| A-1-1 | A | A-1 | X₁,Y₁ – X₂,Y₂ | 1000 | 0001 | ORIGINAL |
| A-1-2 | A | A-1 | X₁,Y₁ – X₂,Y₂ | 0001 | 0002 | ORIGINAL |
| A-2-1 | A | A-2 | X₁,Y₁ – X₂,Y₂ | 0500 | 0003 | ORIGINAL |
| ... | | | ... | | | ⋮ |
| B-2-4 | B | B-2 | X₁,Y₁ – X₂,Y₂ | 0000 | 0002 | COPY & REDUCTION |
| | | | ... | | | |

FIG.14

```
DOCUMENT ID           : C
PAGE                  : 4
DISPLAY AREA          : X1,Y1 - X2,Y2
COPY ORIGINATOR IMAGE : A-1-2
COPY TYPE             : COPY

```
DOCUMENT ID         : C
PAGE                : 4
DISPLAY AREA        : X1,Y1 - X2,Y2
INFORMATION ELEMENT ID : C-4-8

| INFORMATION ELEMENT ID | DOCUMENT ID | PAGE | DISPLAY AREA | COUNT | COPY ID | TYPE | |
|---|---|---|---|---|---|---|---|
| A-1-1 | A | A-1 | X1,Y1 – X2,Y2 | 1000 | 0001 | ORIGINAL | |
| A-1-2 | A | A-1 | X1,Y1 – X2,Y2 | 0002 | 0002 | ORIGINAL | |
| A-2-1 | A | A-2 | X1,Y1 – X2,Y2 | 0500 | 0003 | ORIGINAL | |
| | | | ... | | | | ... |
| B-2-4 | B | B-2 | X1,Y1 – X2,Y2 | 0000 | 0002 | COPY & REDUCTION | |
| C-4-8 | C | C-4 | X1,Y1 – X2,Y2 | 0000 | 0002 | COPY | |
| | | | ... | | | | |

FIG.17

```
DOCUMENT ID          : D
PAGE                 : 2
DISPLAY AREA         : X1,Y1 - X2,Y2
COPY ORIGINATOR IMAGE : A-1-2
COPY TYPE            : COPY

```
DOCUMENT ID          : D
PAGE                 : 2
DISPLAY AREA         : X1,Y1 - X2,Y2
INFORMATION ELEMENT ID : D-2-6

| INFORMATION ELEMENT ID | DOCUMENT ID | PAGE | DISPLAY AREA | COUNT | COPY ID | TYPE |
|---|---|---|---|---|---|---|
| A-1-1 | A | A-1 | X₁,Y₁ – X₂,Y₂ | 1000 | 0001 | ORIGINAL |
| A-1-2 | A | A-1 | X₁,Y₁ – X₂,Y₂ | 0002 | 0002 | ORIGINAL |
| A-2-1 | A | A-2 | X₁,Y₁ – X₂,Y₂ | 0500 | 0003 | ORIGINAL |
| ... | | | ... | | | |
| B-2-4 | B | B-2 | X₁,Y₁ – X₂,Y₂ | 0001 | 0002 | COPY & REDUCTION |
| C-4-8 | C | C-4 | X₁,Y₁ – X₂,Y₂ | 0000 | 0002 | COPY |
| D-2-6 | D | D-2 | X₁,Y₁ – X₂,Y₂ | 0000 | 0002 | COPY |
| | | | ... | | | ... |

FIG.20

| | THUMBNAIL | IMAGE NAME | COUNTER | COPY TYPE |
|---|---|---|---|---|
| ◉ | | A-1-1 | 1000 | ORIGINAL |
| ○ | | A-1-2 | 0002 | ORIGINAL |
| ○ | | A-2-1 | 0500 | ORIGINAL |
| ○ | | B-2-4 | 0001 | COPY & REDUCTION |
| ○ | | C-4-8 | 0000 | COPY |
| ○ | | D-2-6 ←B-2-4 | 0000 | COPY |

PARTIAL IMAGE COUNTER <INDIVIDUAL DISPLAY>

DISPLAY SWITCH: INDIVIDUAL DISPLAY ▼   CLEAR COUNTER

RETURN

FIG.21

| DISPLAY SWITCH | THUMBNAIL | IMAGE NAME | DETAILS | COUNTER | COPY TYPE |
|---|---|---|---|---|---|
| ● | | A-1-1 | --- | 1000 | ORIGINAL |
| ○ | | A-1-2 OTHERS (3 IMAGES) | DETAILS 21a | 0003 | ORIGINAL |
| ○ | ************ ************ | A-2-1 | --- | 0500 | ORIGINAL |

PARTIAL IMAGE COUNTER <RELATED IMAGE AGGREGATION>
RELATED IMAGE AGGREGATION ▶ CLEAR COUNTER
RETURN

FIG.22
| | THUMBNAIL | IMAGE NAME | COUNTER | COPY TYPE |
|---|---|---|---|---|
| ○ | 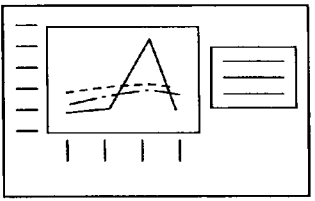 | A-1-2 | 0002 | ORIGINAL |
| ○ | 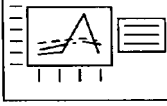 | B-2-4 | 0001 | COPY & REDUCTION |
| ○ | 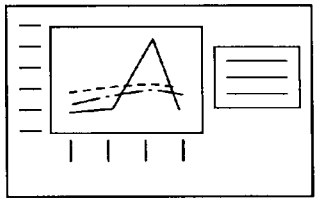 | C-4-8 | 0000 | COPY |
| ○ | 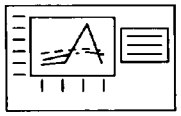 | D-2-6 | 0000 | COPY |
PARTIAL IMAGE COUNTER <DETAILS>
DISPLAY SWITCH: DETAILS | CLEAR COUNTER | TOTAL COUNT : 0003
RETURN

FIG.24

| INFORMATION ELEMENT ID | DOCUMENT ID | PAGE | DISPLAY AREA | COUNT | COPY ID | COPY ORIGINATOR IMAGE | TYPE |
|---|---|---|---|---|---|---|---|
| | | | | ⋮ | | | |
| A-1-1 | A | A-1 | $X_1,Y_1 - X_2,Y_2$ | 1000 | 0001 | — | ORIGINAL |
| A-1-2 | A | A-1 | $X_1,Y_1 - X_2,Y_2$ | 0002 | 0002 | — | ORIGINAL |
| A-2-1 | A | A-2 | $X_1,Y_1 - X_2,Y_2$ | 0500 | 0003 | — | ORIGINAL |
| | | | ⋯ | | | | |
| B-2-4 | B | B-2 | $X_1,Y_1 - X_2,Y_2$ | 0001 | 0002 | A-1-2 | COPY & REDUCTION |
| C-4-8 | C | C-4 | $X_1,Y_1 - X_2,Y_2$ | 0000 | 0002 | A-1-2 | COPY |
| D-2-6 | D | D-2 | $X_1,Y_1 - X_2,Y_2$ | 0000 | 0002 | B-2-4 | COPY |
| ⋯ | | | | | | | |

FIG.25

| | THUMBNAIL | IMAGE NAME | COUNTER | COPY TYPE |
|---|---|---|---|---|
| ⦿ | | A-1-1 | 1000 | ORIGINAL |
| ○ | | A-1-2<br>→B-2-4<br>→C-4-8 | 0002 | ORIGINAL |
| ○ | ************ ********** | A-2-1 | 0500 | ORIGINAL |
| ○ | | B-2-4<br>←A-1-2<br>→D-2-6 | 0001 | COPY & REDUCTION |
| ○ | | C-4-8<br>←A-1-2 | 0000 | COPY |
| ○ | | D-2-6<br>←B-2-4 | 0000 | COPY |

PARTIAL IMAGE COUNTER <INDIVIDUAL DISPLAY>

DISPLAY SWITCH: INDIVIDUAL DISPLAY ▼   CLEAR COUNTER

RETURN

DOCUMENT MANAGEMENT APPARATUS, DOCUMENT MANAGEMENT METHOD, AND COMPUTER-READABLE ENCODING MEDIUM RECORDED WITH A COMPUTER PROGRAM

BACKGROUND OF THE INVENTION

1. Field of the Invention

The present invention is related to a document management apparatus, a document management method, and a computer-readable encoding medium recorded with a computer program, and more particularly to the document management apparatus, the document management method, and the computer-readable encoding medium recorded with a computer program, in which information elements included in document information are managed.

2. Description of the Related Art

Accompanying rapid widespread use of computers, paper documents filed and stored by conventional means have been commonly digitalized into and stored as sets of document data. For example, as an example of storing digitalized information, Japanese Laid-open Patent Application No. 11-25113 suggests a method for retrieving image information. In this method, an image area including image information and a text area including text information are extracted from a document including the image information such as a figure, a table, a picture, and a like, and including the text information. The image area and the text area are stored as information elements, and the image information is retrieved by using the text information as a retrieval text. According to the method disclosed in the Japanese Laid-open Patent Application No. 11-25113, the image information and the text information forming one document are separately stored as individual information.

However, if the image information or the text information is separately stored as the individual information as described above, and are output by downloading, printing, transmitting, copying, and a like, it becomes difficult to comprehend an execution situation of the output.

SUMMARY OF THE INVENTION

The present invention solves or reduces one or more of the above problems.

In an aspect of this disclosure, there is provided a document management apparatus for managing document information and information elements included in the document information, including: a document storing instruction information acquiring part configured to acquire document storing instruction information which instructs to store a second document information including a second information element, which is generated by copying a first information element included in a first document information; an information element acquiring part configured to acquire the second information element included in the second document information based on the acquired document storing instruction information; an information element storing instruction part configured to instruct to store the second information element; a copy originator information acquiring part configured to acquire copy originator information concerning the first information element which is included in the document storing instruction information and is a copy originator of the second information element; and an association information storing instruction part configured to instruct to store association information for associating the second information element with the first information element based on the acquired copy originator information.

In other aspects of this disclosure, there may be provided a document management method conducted in the document management apparatus and a computer-readable encoding medium recorded with a computer program executed by a computer and functioning as the document management apparatus.

BRIEF DESCRIPTION OF THE DRAWINGS

In the following, embodiments of the present invention will be described with reference to the accompanying drawings.

FIG. 4 is a diagram illustrating an example of information stored in a management information storing part according to the embodiment of the present invention;

FIG. 9 is a diagram illustrating an example of information included in management information which is input from a client terminal to the document management apparatus according to the embodiment of the present invention;

FIG. 10 is a diagram illustrating information included in the management information generated by the document management apparatus according to the embodiment of the present invention;

FIG. 12 is a diagram illustrating an example of information to be included in the management information generated by the management information processing part according to the embodiment of the present invention;

FIG. 13 is a diagram illustrating an example of information being stored in the management information storing part according to the embodiment of the present invention;

FIG. 14 is a diagram illustrating an example of information which is input to a client terminal and the document management apparatus according to the embodiment of the present invention;

FIG. 15 is a diagram illustrating an example of information included in the management information generated in the document management apparatus according to the embodiment of the present invention;

FIG. 16 is a diagram illustrating an example of information stored in the management information storing part according to the embodiment of the present invention;

FIG. 17 is a diagram illustrating an example of information which is input to the client terminal and the document management apparatus and is included in the management information, according to the embodiment of the present invention;

FIG. 18 is a diagram illustrating an example of information included in the management information generated in the document management apparatus according to the embodiment of the present invention;

FIG. 19 is a diagram illustrating an example of information stored in the management information storing part according to the embodiment of the present invention;

FIG. 20 is a diagram illustrating a display example concerning an individual display of the management information according to the embodiment of the present invention;

FIG. 21 is a diagram illustrating a display example concerning a related image aggregation display of the management information according to the embodiment of the present invention;

FIG. 22 is a diagram illustrating a display example concerning a details display of the management information according to the embodiment of the present invention;

FIG. 24 is a diagram illustrating an example of information stored in the management information storing part according to the embodiment of the present invention; and FIG. 25 is a diagram illustrating another display example concerning the individual display of the management information according to the embodiment of the present invention.

DESCRIPTION OF THE PREFERRED EMBODIMENT

In the following, an embodiment of the present invention to will be described with reference to the accompanying drawings.

In the embodiment, a document management system 1000 will be described as an example in which an electronic document (hereinafter, simply called "document") is stored through a network, and can be referred to or copied by retrieving from a plurality of documents being stored.

Figure 1:
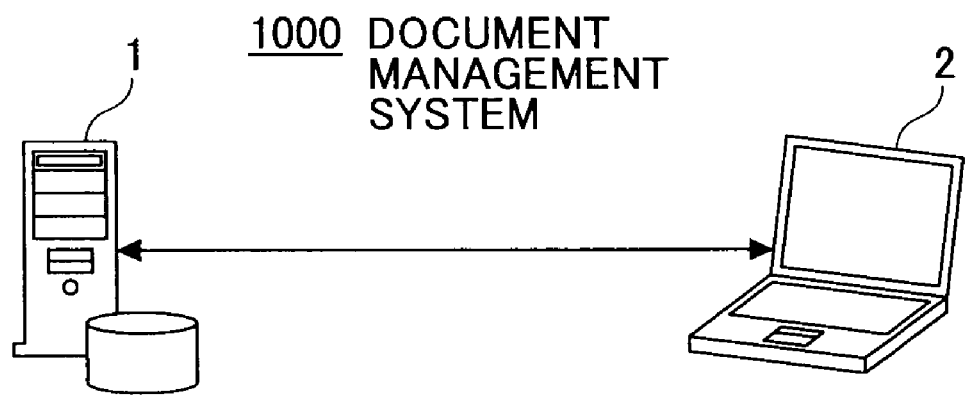
FIG. 1 is a diagram illustrating an operation situation of a document management system according to an embodiment of the present invention.

FIG. 1 is a diagram illustrating an operation situation of the document management system according to the embodiment. As illustrated in FIG. 1, the document management system 1000 according to the embodiment includes a document management apparatus 1 and a client terminal 2. The document management apparatus 1 according to the embodiment is a server computer and the client terminal 2 is a PC (Personal Computer) or a like, in which the server computer and the PC are general information processing apparatuses. As illustrated in FIG. 1, the document management apparatus 1 and the client terminal 2 according to the embodiment are connected via the network. The client terminal 2 stores document information to the document management apparatus 1, or refers to the document information being stored in the document management apparatus 1 through the network.

Figure 2:
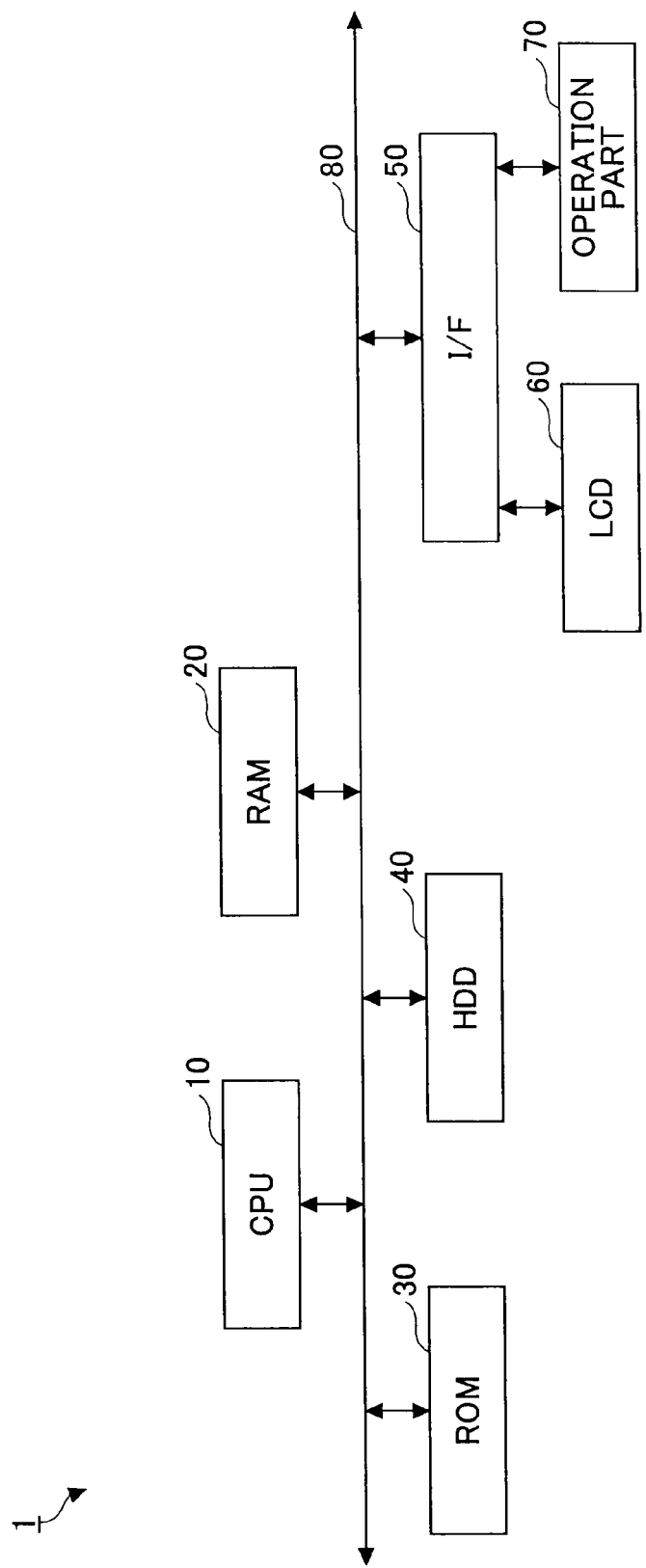
FIG. 2 is a block diagram illustrating a hardware configuration of an apparatus included in the document management system according to the embodiment of the present invention.

Next, a hardware configuration of the document management apparatus 1 according to the embodiment will be described. FIG. 2 is a block diagram illustrating the hardware configuration of the document management apparatus 1 according to the embodiment. The hardware configuration regarding the document management apparatus 1 according to the embodiment is illustrated in FIG. 1, since the hardware configuration of the server computer is similar to that of the PC as an information processing apparatus, and the client terminal 2 has a hardware configuration similar to the server computer. The document management apparatus 1 according to the embodiment includes a CPU (Central Processing Unit) 10, a RAM (Random Access Memory) 20, a ROM (Read Only Memory) 30, an HDD (Hard Disk Drive) 40, and an I/F (InterFace) 50, which are mutually connected via a bus 80. Also, an LCD (Liquid Crystal Display) 60 and an operation part 70 are connected to the I/F 50.

The CPU 10 is an operating unit, and controls the entire the document management apparatus 1. The RAM 20 is a non-volatile storage medium possible to read and write information at high speed, and is used as a working area when the CPU 10 processes information. The ROM 30 is a non-volatile storage medium dedicated to read data, and stores programs such as firmware and a like. The HDD 40 is a non-volatile storage medium possible to write data, and stores an OS (Operating System), various control programs, application programs, and a like.

The I/F 50 is used to connect the bus 80 to various hardware devices, the network, and the like, and controls communications between the bus 80 and them. The LCD 60 is a visual user interface for a user to confirm states of the document management apparatus 1. The operation part 70 is a keyboard, a mouse, or a like as a user interface for a user to input information to the document management apparatus 1. As described with reference to FIG. 1, the document management apparatus 1 according to the embodiment is operated as the server computer. Accordingly, in the document management apparatus 1, user interfaces such as the LCD 60, the operation part 70, and the like can be omitted.

In the hardware configuration, a program stored in a storage medium such as the ROM 30, the HDD 40, an optical disk (not shown), or a like is read out and stored into the RAM 20, and the program is executed in accordance with a control of the CPU 10, so that a software control part is formed. The software control part formed in this manner is combined with hardware, and functional blocks are formed to realize functions of the document management apparatus 1 according to the embodiment.

Figure 3:
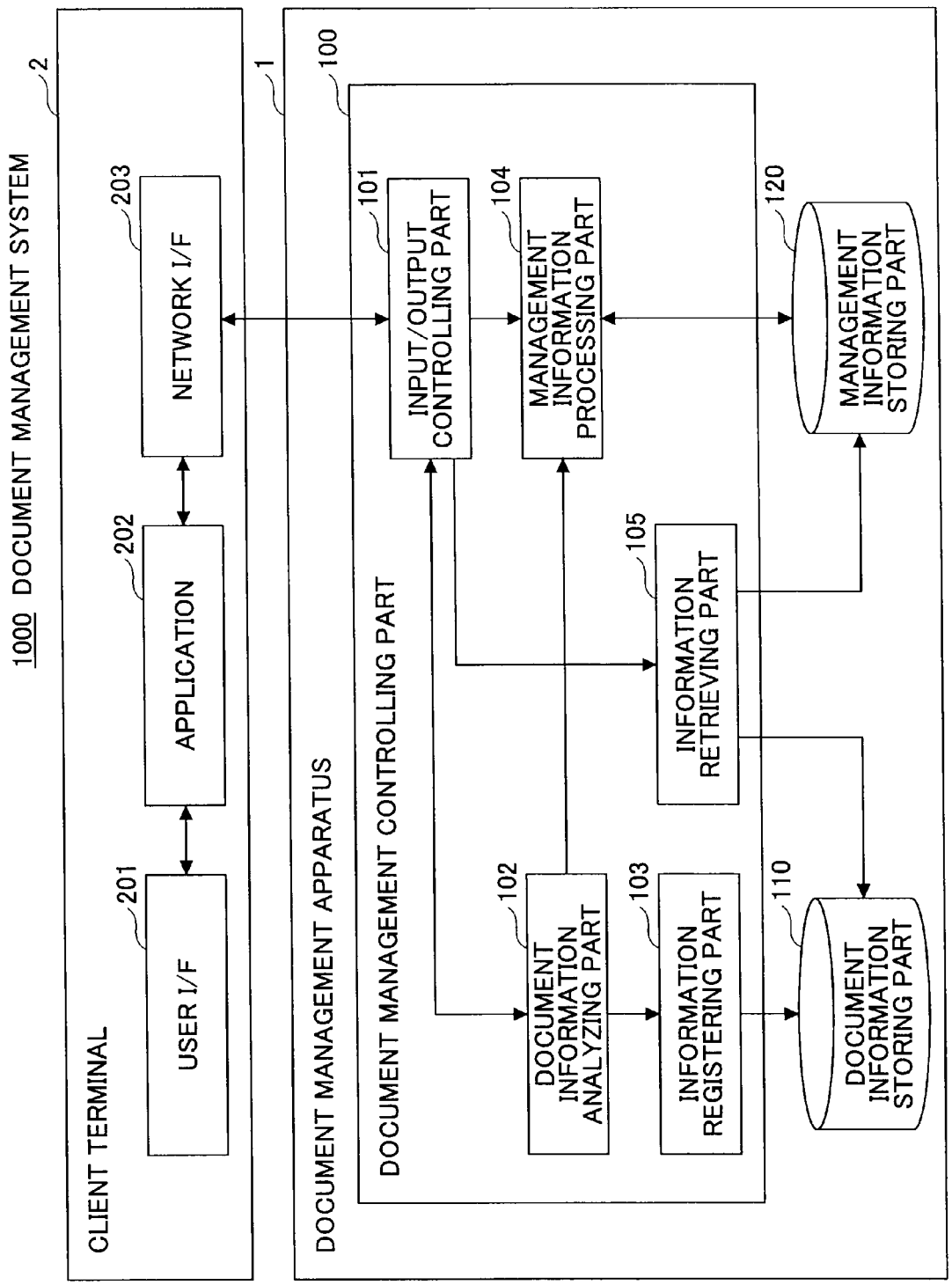
FIG. 3 is a block diagram illustrating a functional configuration of the document management system according to the embodiment of the present invention.

Next, a functional configuration of the document management system 1000 including the document management apparatus 1 and the client terminal 2 according to the embodiment will be described with reference to FIG. 3. FIG. 3 is a block diagram illustrating the functional configuration of the document management system according to the embodiment. As illustrated in FIG. 3, the document management apparatus 1 according to the embodiment includes a document management controlling part 100, a document information storing part 110, and a management information storing part 120. The document management controlling part 100 includes an input/output controlling part 101, a document information analyzing part 102, an information registering part 103, a management information processing part 104, and an information retrieving part 105. Also, the client terminal 2 according to the embodiment includes a user I/F 201, an application 202, and a network I/F 203.

In the document management system 1000 according to the embodiment, the document information storing part 110 is a storage unit used to store document information to be a management subject, and is configured by a non-volatile storage medium such as the HDD 40 illustrated in FIG. 1 or a like. The document information storing part 110 according to the embodiment divides the document information into elements (information elements) and separately stores each of the information elements forming the document information, instead of storing as the document information. A storing situation of the information element by the document information storing part 110 will be described later. The management information storing part 120 stores management information to manage the information elements stored in the document information storing part 110.

Referring to FIG. 4, an example of information stored in the management information storing part 120 will be described. As illustrated in FIG. 4, the management information storing part 120 according to the embodiment includes an information element ID, a document ID, a page, a display area, a count, a copy ID, a type of the information, and a like. The information element ID is information identifying the information element stored in the document information storing part 110. The document ID is information identifying the information element included in the document The page is information of a page including the information element in the document. The display area is information indicating an area in which the information element is displayed in the page. The count is information indicating a count number how many times the information element is copied. As described above, information stored in the management information storing part 120 includes output count number information, and information stored in the management information storing part 120 is used as an output count number information.

The copy ID is an ID for indicating a copy relationship of the information element, and the same ID is assigned to an original information element and a copied information element when the original information element is copied. As described above, information stored in the management information storing part 120 includes copy relationship information concerning a copy relationship of partial image information, and information stored in the management information storing part 120 is used as the copy relationship information. The type is information indicating that the information element is an original information element, a copied information element, or a copied and edited information element. Information stored in the management information storing part 120 includes copy situation information concerning a copy situation of the partial image information, and information stored in the management information storing part 120 is used as the copy situation information.

As described above, in the document management system 1000 according to the embodiment, the document information storing part 110 stores the information elements forming each document, and stores the management information in the management information storing part 120 to form one document by connecting the information elements being separately managed.

The document management controlling part 100 conducts a document management function of the document management apparatus 1 according to the embodiment, and each of functions included in the document management controlling part 100 is formed by executing programs loaded in the RAM 20 illustrated in FIG. 2 in accordance with a control of the CPU 10. The input/output controlling part 101 acquires information which is input from the client terminal 2 to the document management apparatus 1, and outputs information to be sent to the client terminal 2.

The document information analyzing part 102 analyzes the document information which is generated or edited at the client terminal 2 and is instructed to store to the document management apparatus 1. After that, the document information analyzing part 102 extracts the information elements such as figures, text, and a like included in the document information and the management information for managing the information elements, from the document information. The information element and the management information will be described later.

The information registering part 103 stores the information element extracted by the document information analyzing part 102, to the document information storing part 110. The management information processing part 104 processes the management information extracted by the document information analyzing part 102. For example, the management information processing part 104 stores the management information to the management information storing part 120. Also, the management information processing part 104 acquires the management information which has been already stored in the management information storing part 120, based on the management information extracted by the document information analyzing part 102. Functions of the management information processing part 104 will be described later.

The information retrieving part 105 retrieves the document information stored in the document information storing part 110 and the management information storing part 120 based on a request from the client terminal 2, and sends the document information to the client terminal 2 through the input/output controlling part 101.

The user I/F 201 includes a display unit such as a LCD (Liquid Crystal Display) on which the user at the client terminal 2 confirms states of an operation part such as the keyboard, the mouse, and the like of the client terminal 2 and a state of the client terminal 2. The user I/F 201 corresponds to the I/F 50 and includes the LCD 60 and the operation part 70 illustrated in FIG. 2.

The application 202 includes an edit part for the user at the client terminal 2 to browse or edit the document. The application 202 is formed by executing a program loaded in the RAM 20 illustrated in FIG. 2 in accordance with a control of the CPU 10. The network I/F 203 is an interface for exchanging information between the client terminal 2 and the document management apparatus 1 through the network, and is formed by the I/F 50 illustrated in FIG. 2.

Figure 5:
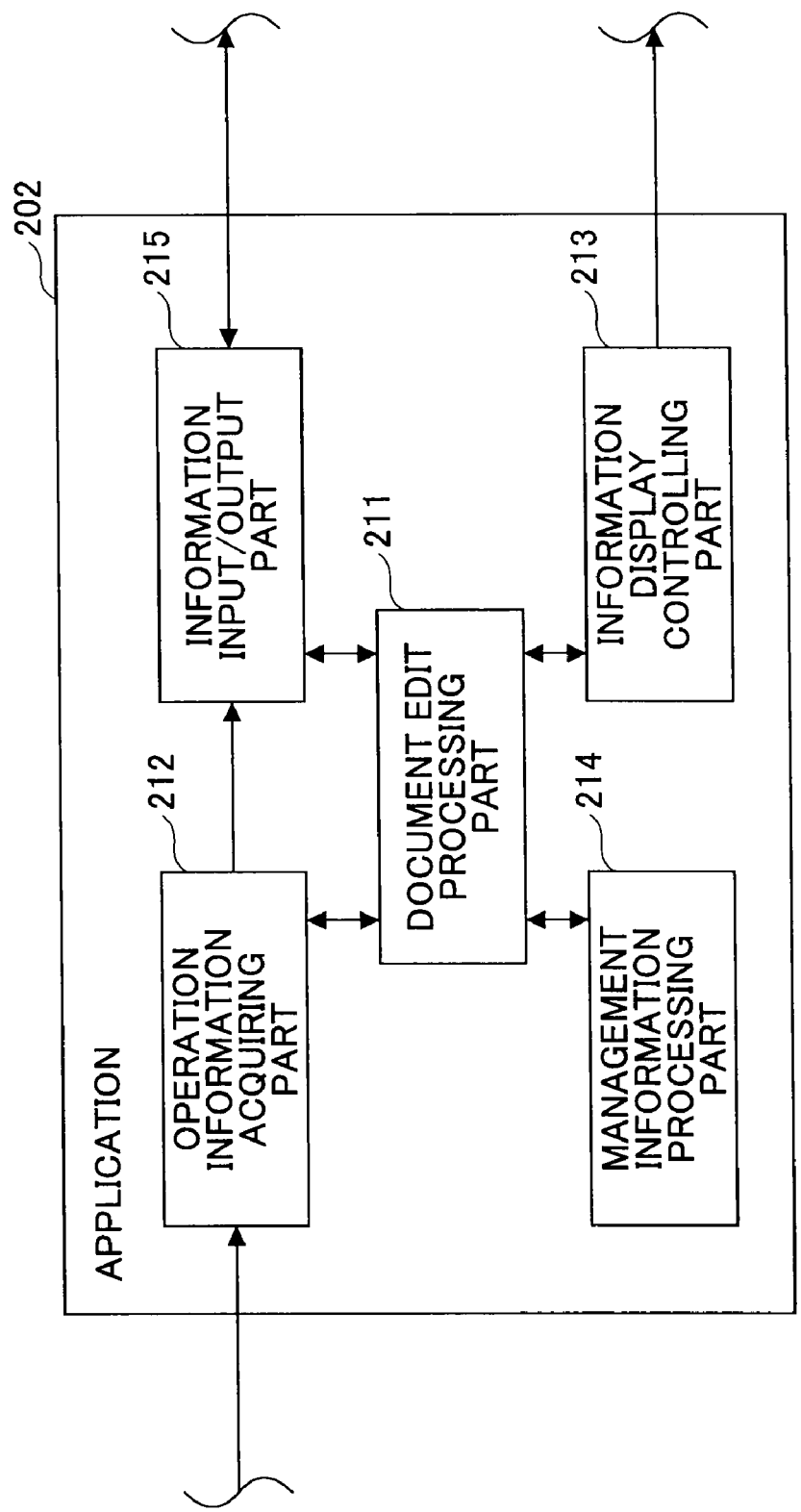
FIG. 5 is a block diagram illustrating a functional configuration of an application according to the embodiment of the present invention.

Next, the application 202 of the client terminal 2 will be described in detail. FIG. 5 is a block diagram illustrating a functional configuration of the application 202 according to the embodiment. As illustrated in FIG. 5, the application 202 includes a document edit processing part 211, an operation information acquiring part 212, an information display controlling part 213, a management information processing part 214, and an information input/output part 215.

The document edit processing part 211 processes editing and browsing of the document information. The operation information acquiring part 212 acquires operation information input by the user through the user I/F 201 such as the keyboard, the mouse, and the like. The information display controlling part 213 generates the display information used to display a process state of the document edit processing part 211 at the user I/F 201 such as the LCD 60 or the like. The management information processing part 214 processes the management information in response to editing the document information by the document edit processing part 211. The information input/output part 215 outputs the document information, which is read, edited, or created by the application 202.

Figure 6:
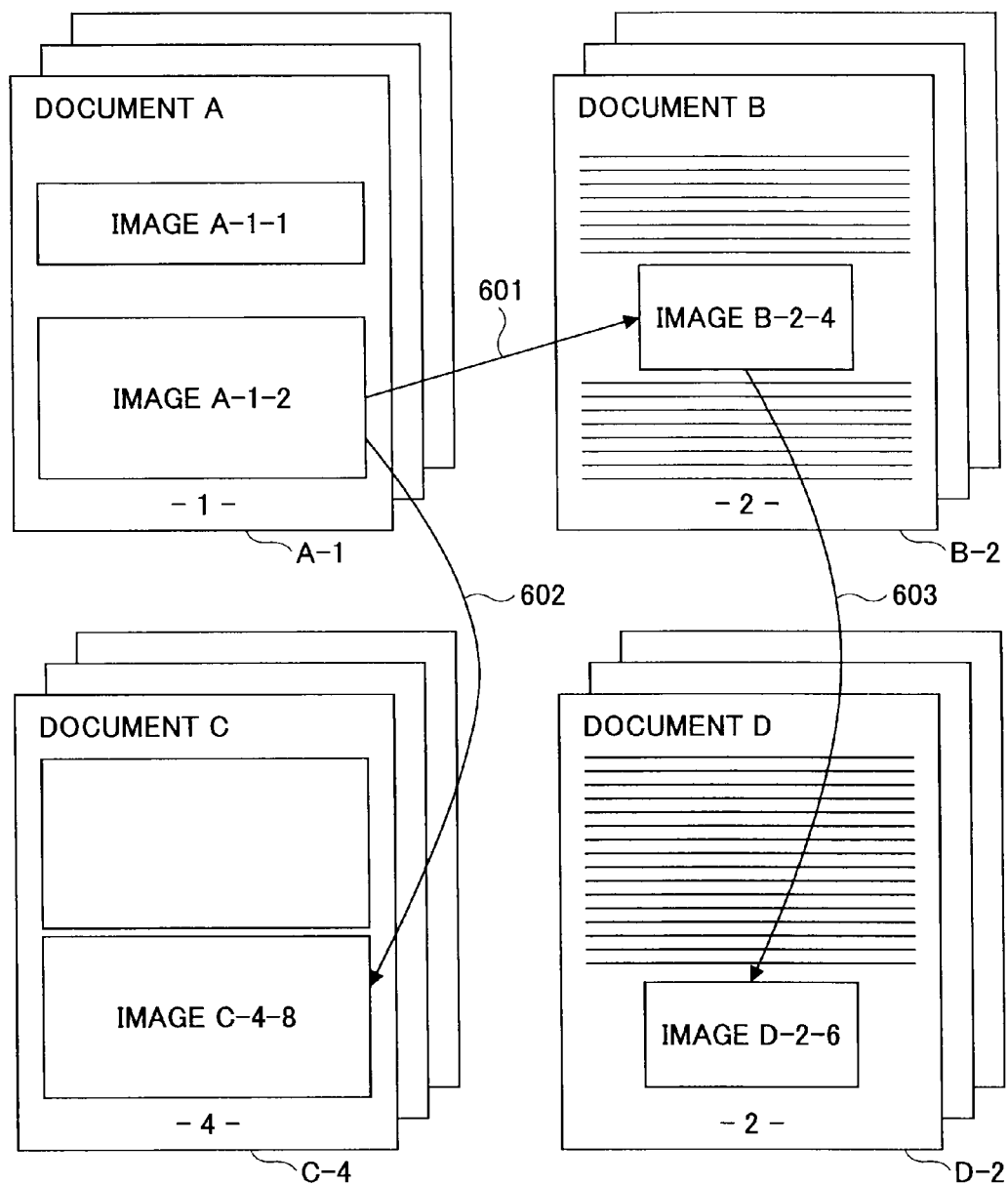
FIG. 6 is a diagram illustrating an edit situation of a document conducted in the embodiment of the present invention.

In the document management system 1000 according to the embodiment, information stored in the management information storing part 120 is characterized in a case in which the document information is edited in the application 202. FIG. 6 is a diagram illustrating an edit situation of the document conducted in the embodiment. In the embodiment, as indicated by an arrow 601 in FIG. 6, an image A-1-2 arranged in page 1 (indicated by a numeral A-1) of a document A is reduced and copied as an image B-2-4 in page 2

(indicated by a numeral B-2). Also, as indicated by an arrow 602, an image A-1-2 is copied as an image C-4-8 in page 4 (indicated by a numeral C-4) of a document C. In addition, as indicated by arrow 603, the image B-2-4 being reduced and copied in the page 2 (indicated by a numeral B-2) of the document B is further copied as an image D-2-6 in page 2 (indicated by a numeral D-2) of a document D.

A method for storing information elements in the document information storing part 110 will be described. In FIG. 6, the page 1 of the document A is illustrated. As illustrated in FIG. 6, an image A-1-1 and an image A-1-2 are illustrated in the page 1 of the document A. The image A-1-1 and the image A-1-2 are partial images displayed at a portion of the document A. In this case, the document information storing part 110 stores image information respective to the partial image A-1-1 and the partial image A-1-2 as the information elements. Moreover, in a case in which information displayed in a document is text information, the text information is stored as image information for each text group, and is stored as the text information showing the text as well as the image information. For example, the text group may be one paragraph.

Figure 7:
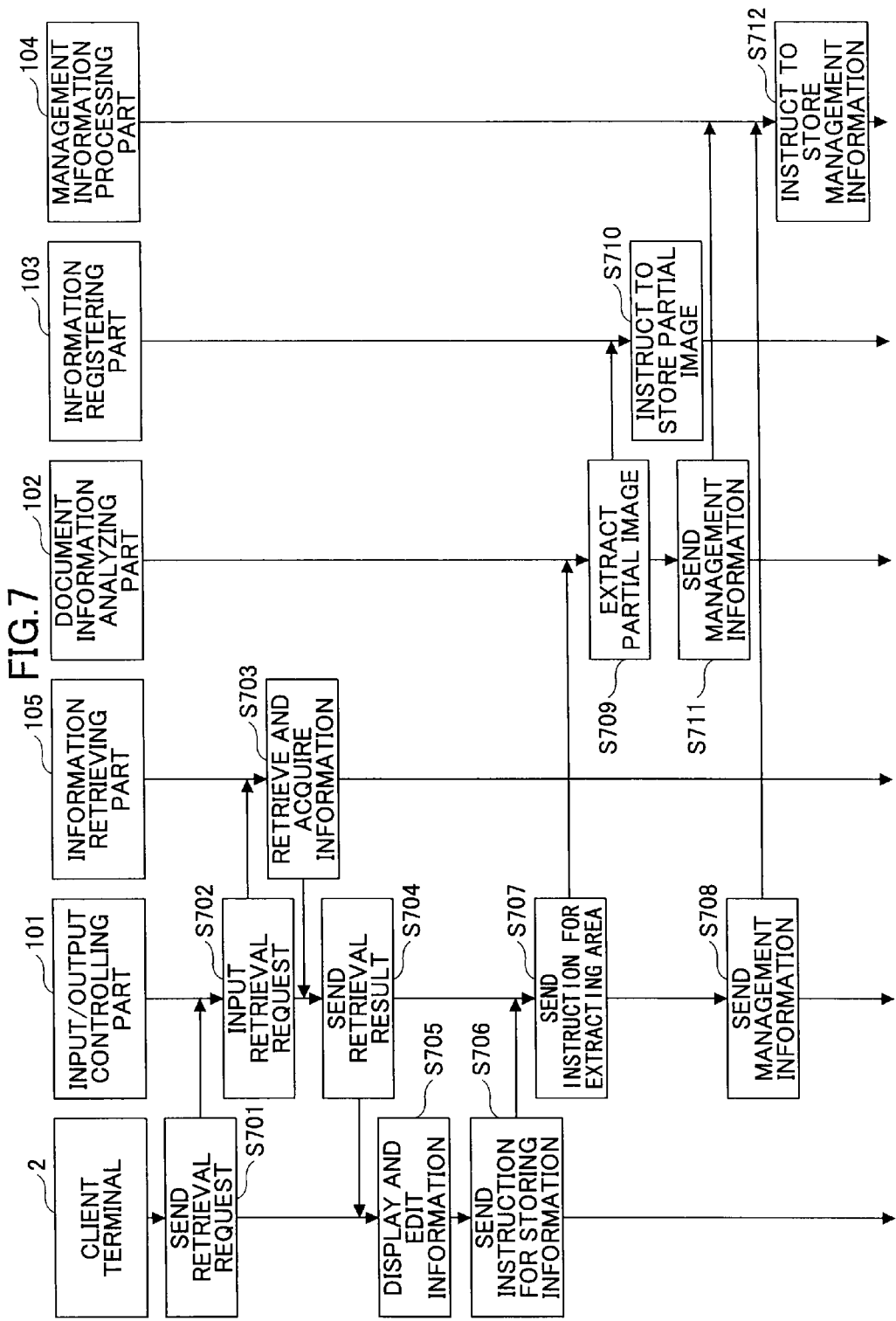
FIG. 7 is a sequence diagram illustrating an operation of the document management system according to the embodiment of the present invention.

FIG. 7 is a sequence diagram illustrating an operation of the document management system according to the embodiment. First, an operation example will be described in a case in which the image A-1-2 arranged in the page 1 of the document A is reduced and copied as the image B-2-4 in the page 2 of the document B in FIG. 6. As illustrated in FIG. 7, when a user displays and edits a document in the application 202 of the client terminal 2, the user operates the application 202 through the user I/F 201 of the client terminal 2, and sends a retrieval request for retrieving the document information being stored in the document management apparatus 1 (S701). When the document A and the document B are determined as edit subjects, the retrieval request includes information to acquire the document A and the document B, and is sent from the application 202. The retrieval request is sent to the document management apparatus 1 through the network I/F 203 from the application 202. The retrieval request input to document management apparatus 1 is acquired by the input/output controlling part 101, and the input/output controlling part 101 inputs the retrieval request to the information retrieving part 105 (S702).

When the information retrieving part 105 receives the retrieval request, the information retrieving part 105 searches for and acquires the document information stored in the document information storing part 110 based on the received retrieval request, and inputs the document information to the input/output controlling part 101 (S703). The information retrieving part 105 acquires the document A and the document B, and sends them to the input/output controlling part 101. As described above, the document information storing part 110 according to the embodiment divides the document information into elements (information elements) and stores the divided document information for each of the elements (information elements). Accordingly, the information retrieving part 105 acquires the management information for forming the document A and the document B. Also, the information retrieving part 105 acquires the information elements for forming the document A and the document B, and sends the acquired information elements to the input/output controlling part 101.

It should be noted that the information retrieving part 105 may send information such as a URL (Uniform Resource Locator) to access the document A and the document B, that is, it may send the information to acquire the document A and the document B to the input/output controlling part 101, instead of sending the document A and the document B themselves. When the input/output controlling part 101 acquires a retrieval result from the information retrieving part 105, the input/output controlling part 101 sends the acquired retrieval result to the client terminal 2 being a request originator of the retrieval (S704). As described above, the retrieval result includes the management information and the information elements to form the document A and the document B.

Figure 8:
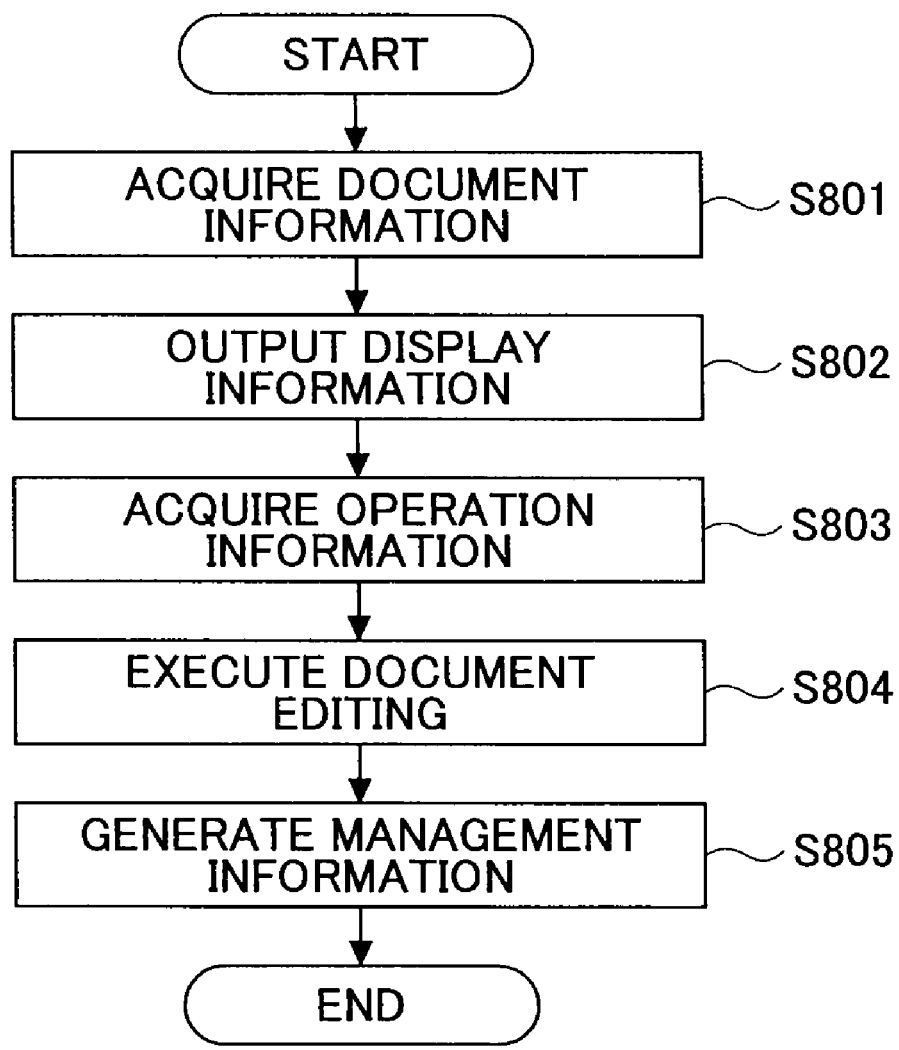
FIG. 8 is a flowchart for explaining an edit operation of the document according to the embodiment of the present invention.

When the client terminal 2 receives the retrieval result from the document management apparatus 1, the application 202 reads the document information and displays a document. The user operates the application 202 through the user I/F 201, and edits the document (S705). A process in the step S705 will be described in detail with reference to FIG. 8. FIG. 8 is a flowchart for explaining an edit operation of the document according to the embodiment. First, the document input/output part 215 acquires the document information sent from the document management apparatus 1 (S801). The document edit processing part 211 reads the document information which the information input/output processing part 215 acquired. The information display controlling part 213 generates display information used to display the document information, which the document edit processing part 211, at the user I/F 201, and outputs the display information to the user I/F 201 (S802). Accordingly, the document information is displayed at the user I/F 201 such as the LCD 60 or the like, and the user can recognize and operate the document information.

A generation process of the display information in S802 will be described. As described above, the document information according to the embodiment is divided into each of the information elements and stored in the document information storing part 110. In a case of forming the document information based on the information elements stored in the document information storing part 110, the document information is formed based on the management information as described with reference to FIG. 4. For example, when the document A is displayed, the document edit processing part 211 generates the document A by combining the information elements which are displayed in corresponding areas for each page, based on the management information of the document A. Based on information of the document generated by the document edit processing part 211, the information display controlling part 213 generates the display information.

In the process of the S705, when editing as indicated by the arrow 601 in FIG. 6, the user operates the user I/F 201 such as the mouse, the keyboard, or the like, and inputs operation information to copy the image A-1-2 displayed in the page 1 of the document A and to paste to the page 2 of the document 2 in the application 202. The operation information acquiring part 212 acquires the operation information which the user inputs via the user I/F 201 (S803). The document edit processing part 211 executes an edit which copies the image A-1-2 to the page 2 of the document B as indicated by the arrow 601 in FIG. 6, based on the operation information which the operation information acquiring part 212 acquires (S804). That is, the document edit processing part 211 functions as a document information editing part.

When the document edit processing part 211 executes the edit which copies the image A-1-2 to the page 2 of the document B, the management information processing part 214 generates the management information concerning the image which is copied to the document B based on the image A-1-2 as an original (S805). That is, the management information processing part 214 functions as a copy originator information generating part. An example of the management information, which the management information processing part 214 generates in processing S705, will be described with reference to FIG. 9. FIG. 9 illustrates the example of the management information which the management information processing part 214 generates in response to the process of the document edit processing part 211 in processing the S705. As illustrated in FIG. 9, the management information processing part 214 generates the management information including information of the document ID, the page, the display area, the copy originator image, and the copy type.

The document ID illustrated in FIG. 9 is used to specify a document being a copy destination of an image. The document ID is the information described with reference to FIG. 4, that is, information corresponding to the document ID stored in the management information storing part 120 of the document management apparatus 1. In the embodiment, since the document B is the copy destination, the document ID is "B". The page is information indicating a page number to display an image being a copy subject in the document of the copy destination. In the embodiment, since the image is copied to the page 2 of the document B, the page indicates "2". The display area is information indicating a display area to display the image being the copy subject in a page of the document of the copy destination. The information of the document ID, the page, and the display area illustrated in FIG. 9 is used as information element specifying information to specify partial images being the information elements in the embodiment.

The copy originator image information is information indicating the image of the copy originator when the partial image is copied. In the embodiment, since the image A-1-2 is copied, the copy originator image is indicated by "A-1-2". The copy type is information indicating a copy situation when the partial image is copied. In the embodiment, since the image A-1-2 is reduced and copied, the copy type indicates "COPY & REDUCTION". The process of the step S705 conducted by the application 202 is completed by these processes described above.

When the editing the document by the application 202 is completed, and the user instructs to store the document B to the document management apparatus 1 by inputting an operation information via the user I/F 201, the client terminal 2 sends an instruction for storing information to the document management apparatus 1 (S706). The instruction for storing information in the step S706 includes information of the document B edited based on an operation of the user and the management information generated in the step S805. That is, the instruction for storing information is used as an instruction for storing a document. The instruction for storing document is sent based on a control of the document edit processing part 211 in the application 202 from the information input/output part 215 via the network I/F 203. That is, the document edit processing part 211 and the information input/output part 215 function as a document storing instruction part.

The instruction for storing information input to the document management apparatus 1 is acquired by the input/output controlling part 101 of the document management controlling part 100. That is, the input/output controlling part 101 functions as a document storing instruction information acquiring part. Also, since the instruction for storing information includes the management information illustrated in FIG. 9, and the management information includes information element specifying information, the input/output controlling part 101 functions as an information element specifying information acquiring part.

When the input/output controlling part 101 acquires the information storing information, the input/output controlling part 101 sends an instruction for extracting each of areas corresponding to the information elements which form document information included in the instruction for storing information to the document information analyzing part 102 (S707). In the S707, the input/output controlling part 101 also sends information of the document B simultaneously when sending the information for extracting each of the areas. Moreover, the input/output controlling part 101 sends the management information (information described with reference to FIG. 8) included in the instruction for storing information, to the management information processing part 104 (S708).

When receiving the instruction for extracting each of the areas, the document information analyzing part 102 recognizes and extracts areas of each page included in the document B as partial images (S709). That is, the document information analyzing part 102 functions as an information element acquiring part configured to acquire partial images which are information elements. The document information analyzing part 102 extracts images included in the document B, and also extracts text included in the document B as an image for each text group such as a paragraph. Furthermore, when extracting text as images, the document information analyzing part 102 extracts information concerning original text to retain with the extracted text. The document information analyzing part 102 inputs the extracted partial images to the information registering part 103. The information registering part 103 stores the partial images which are input from the document information analyzing part 102, to the document information analyzing part 102 (S710). That is, the document information storing part 110 functions as an information element storing instruction part.

Moreover, in the step S709, the document information analyzing part 102 generates the management information of the partial images and sends the management information with the partial images to the management information processing part 104 (S711). Referring to FIG. 10, the management information, which the document information analyzing part 102 generates in the step S709, will be described. FIG. 10 is a diagram illustrating information included in the management information generated by the document information analyzing part 102 of the document management apparatus according to the embodiment. As illustrated in FIG. 10, the management information generated by the document information analyzing part 102 in the step S709 includes information concerning the document and pages including the extracted partial images, and information concerning areas displaying the partial images in the pages. Similar to the example illustrated in FIG. 9, information of a document ID, a page, and a display area illustrated in FIG. 10 is used as the information element specifying information to specify a partial image being the information element. Also, as illustrated in FIG. 10, when extracting the partial images, the document information analyzing part 102 generates an ID (information element ID) to identify the partial image.

Figure 11:
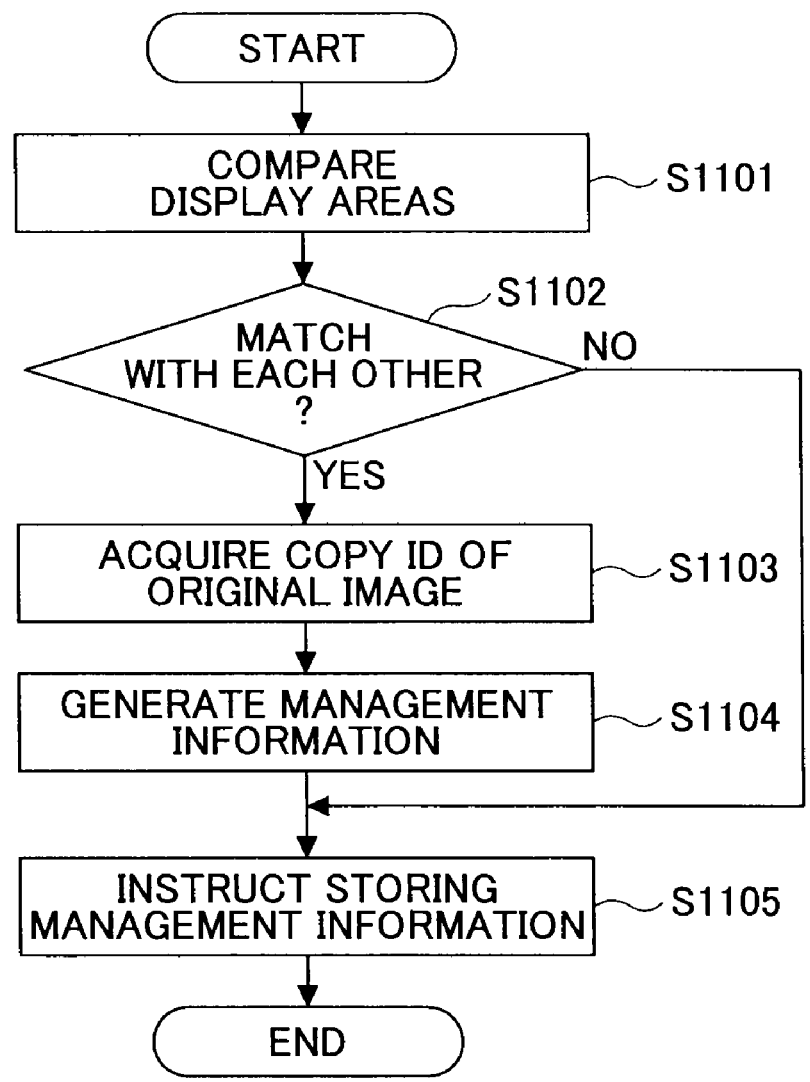
FIG. 11 is a flowchart for explaining a process of storing the management information according to the embodiment of the present invention.

The management information processing part 104 stores the management information of the partial images stored in the document information storing part 110 to the management information storing part 120, based on the management information received from the input/output controlling part 101 and the management information received from the document information analyzing part 102 (S712). That is, the management information processing part 104 functions as a copy originator information acquiring part. Next, a process conducted by the management information processing part 104 in the step S712 will be described with reference to FIG. 11. FIG. 11 is a flowchart for explaining a process of storing the management information according to the embodiment.

As illustrated in FIG. 11, when acquiring the management information respectively from the input/output controlling part 101 and the document information analyzing part 102, the image information processing part 104 refers the respective management information and compares with the document, pages, and the display area (S1101). In the embodiment, the information of the document ID, the page, and the display area illustrated in FIG. 9 are compared with the information of the document ID, the page, and the display area. As a result from this process of S1101, when it is determined that the display area is matched with in the same document and the same page (YES of S1102), the management information processing part 104 determines that the management information input from the document information analyzing part 102 is the management information of the partial image concerning a copy. In this case, the management information processing part 104 acquires a copy ID of a copy originator image from the management information storing part 120, based on information of the copy originator image included in the management information received from the input/output controlling part 101 (S1103).

In the embodiment, information of the display area included in the management information illustrated in FIG. 9 is compared with information of the display area included in the management information illustrated in FIG. 10 in the step S1102. Both sets of the information are information of the display area of the image B-2-4 which is the partial image displayed in the page 2 of the document B. Accordingly, it is determined that both the display areas match with each other. When the display area of the management information which is input from the input/output controlling part 101 matches with the display area of the management information which is input from the document information analyzing part 102, the management information processing part 104 accesses the management information storing part 120 based on an information element ID "A-1-2" which is information of the copy originator image, and acquires information indicating "0002" which is the copy ID of the information element identified by the information element ID "A-1-2" as illustrated in FIG. 4 (S1103).

When acquiring the copy ID, the management information processing part 104 newly generates management information to be stored, by using two sets of the management information respectively illustrated in FIG. 9 and FIG. 10 and the acquired copy ID (S1104). FIG. 12 is a diagram illustrating an example of information to be included in the management information generated by the management information processing part 104 according to the embodiment. As illustrated in FIG. 12, the management information newly generated in the step S1104 includes information indicating an information element ID specifying the partial image which is newly stored in the document information storing part 110, a document and a page including the partial image, a display area in which the partial area is displayed in the page, a copy ID which is common with a copy originator of the partial image, and a type of a copy.

When newly generating the management information to be stored, the management information processing part 104 stores the generated management information in the management information storing part 120 (S1105), and terminates the process. That is, the management information processing part 104 functions as an association information storing instruction part. FIG. 13 is a diagram illustrating information included in the management information storing part 120 in a state of newly registering the management information, as a result from a process of the S1105. In FIG. 13, information being registered or updated is emphasized with an underline.

As illustrated in FIG. 13, the management information of the partial image newly registered to the document information storing part 110 is stored as an information element ID "B-2-4". Since it is a new registration, a count indicates "0000" for the information element ID "B-2-4". Also, regarding the management information of the image A-1-2 which is a copy originator of the image B-2-4, a value of the count is updated from "0000" to "0001". That is, the management information processing part 104 functions as an output count management information updating part.

As described in the embodiment, the management information processing part 104 determines whether or not the partial image newly stored is an image concerning a copy, based on a correspondence between information of the display area which is one set of the partial image specifying information included in the management information input from the client terminal 2 and information of the display area which is another set of the partial image specifying information input from the document information analyzing part 102. Then, when it is determined that the partial image is the image concerning the copy, the management information processing part 104 recognizes that the information of the copy originator image included in the management information input from the client terminal 2 is a partial image of the copy originator of the newly stored partial image.

On the other hand, when the display area included in the management information illustrated in FIG. 9 matches with the display area included in the management information illustrated in FIG. 10 in the step S1102, the management information processing part 104 recognizes that the management information input from the document information analyzing part 102 is the management information of the new partial image. Then, the management information processing part 104 stores the management information acquired from the document information analyzing part 102 as new management information to the management information storing part 120. In this case, the count remains as "0000" and a new ID is assigned as the copy ID. The copy type is "ORIGINAL".

By conducting the above described processes, the operation of the document management system 1000 according to the embodiment is completed. In the embodiment, if a process indicated by the arrow 601 in FIG. 6 is conducted, the management information is stored in a situation illustrated in FIG. 13. As illustrated in FIG. 13, the same copy ID is assigned to both the image A-1-2 being the partial image of the copy originator and the image B-2-4 being the partial image of the copy destination. Also, as illustrated in FIG. 13, information such as "ORIGINAL", "COPY & REDUCTION", or a like is stored as the type concerning the copy. Accordingly, an administrator for managing the document management system 1000 can recognize that the image B-2-4 is a partial image copied based on the image A-1-2, and can further recognize that a reduction process is conducted when the image B-2-4 is copied from the image A-1-2.

Next, a copy process indicated by the arrow 602 in FIG. 6, that is, a copy process for copying the image A-1-2 as the image C-4-8 to the page 4 of the document C will be described as an example with reference to FIG. 7. Processes in the steps S701 through S704 are conducted in the same manner described above. In the copy situation of the arrow 602, retrievals of the document A and the document C are requested in the step S701, and sets of document information respectively to the document A and the document C are sent as retrieval results.

In the S705, the document A and the document C are displayed at the user I/F 201 of the client terminal 2, and an edit process is conducted to copy the image A-1-2 as the image C-4-8 to the page 4 of the document C. In this case, an example of the management information generated by the management information processing part 214 of the application 202 will be described with reference to FIG. 14. As illustrated in FIG. 14, the document ID is "C" and the page is "4" in the copy situation of the arrow 602. Moreover, the display area is used as information indicating an area where a copied image is displayed in the page 4 of the document C. Furthermore, in the copy situation of the arrow 602, since the image A-1-2 is simply copied and no further edit process is conducted to the image A-1-2 in order to enlarge or reduce, the copy type is "COPY".

After that, the S706 through S710 are similarly conducted as described above. An example of the management information, which is generated by the document information analyzing part 102 and is sent to the management information processing part 104 in the step S711, is described with reference to FIG. 15. As illustrated in FIG. 15, the document information analyzing part 102 generates the management information including information concerning the document, the page, and the display area, in which the partial image being extracted is included, and also generates the ID for identifying the partial image.

After that, the S712 is conducted similar to the previously described copy situation, and the management information is stored in the management information storing part 120. An example of the management information, which is stored in the management information storing part 120 after completing the process for the copy situation of the arrow 602, will be described with reference to FIG. 16. In FIG. 16, information being registered or updated is emphasized with an underline similar to FIG. 13. As illustrated in FIG. 16, the management information of the partial image, which is newly registered to the document information storing part 110, is stored with the information element ID "C-4-8". The count indicates "0000" since this management information is a new registration. Also, a value of the count is changed from "0001" to "00002" for the management information of the image A-1-2, which is the copy originator of the image C-4-8.

Next, an example of a copy process indicated by the arrow 603 in FIG. 6, that is, a copy process for copying the image B-2-4 as the image D-2-6 on the page 2 of the document D will be described with reference to FIG. 7. The S701 through S704 in FIG. 7 are conducted in the same manner described above. In the copy situation of the arrow 603, retrievals of the document B and the document D in the step S701 are requested, and two sets of document information corresponding to the document B and the document D are sent as retrieval results.

In the S705, the document B and the document D are displayed at the user I/F 201 of the client terminal 2, an edit process is conducted to copy the image B-2-4 as the image D-2-6 to the page 2 of the document D. In this case, an example of the management information generated by the management information processing part 214 of the application 202 will be described with reference to FIG. 17. As illustrated in FIG. 17, in the copy situation of the arrow 603, the document ID is "D", and the page is "2". Moreover, the display area is information indicating an area where the copied image is displayed in the page 2 of the document D. Furthermore, in the copy situation of the arrow 603, since the image B-2-4 is simply copied and no further edit process is conducted to the image A-1-2 in order to enlarge or reduce, the copy type is "COPY".

After that, the S706 through the S710 are conducted in the same manner described above. An example of the management information, which is generated by the document information analyzing part 102 and sent by the management information processing part 104 in the step S711, will be described with reference to FIG. 18. As illustrated in FIG. 18, the document information analyzing part 102 generates the management information including information concerning the document, the page, and the display area, in which the partial image being extracted is included, and also generates the ID for identifying the partial image.

After that, the S712 is conducted in the same manner described above, and the management information is stored in the management information storing part 120. An example of the management information, which is stored in the management information storing part 120 after the process in the copy situation of the arrow 603 is completed, will be described with reference to FIG. 19. In FIG. 19, information being registered or updated is emphasized with an underline similar to FIG. 13. As illustrated in FIG. 19, the management information of the partial image, which is newly registered to the document information storing part 110, is stored with the information element ID "D-2-6". The count indicates "0000" since this management information is a new registration. Also, a value of the count is changed from "0000" to "0001" for the management information of the image B-2-4, which is the copy originator of the image D-2-6.

Next, a situation, in which the administrator of the document management system 1000 according to the embodiment confirms information stored in the document information storing part 110 and information stored the management information storing part 120, will be described. In a case in that the administrator of the document management system 1000 confirms the information stored in the document information storing part 110 and the information stored the management information storing part 120, the administrator accesses the document management apparatus 1 through the client terminal 2 in the same manner described above. In the document management apparatus 1, the information retrieving part 105 sends the information stored in the document information storing part 110 and the information stored the management information storing part 120, to the client terminal 2 through the input/output controlling part 101 in response to an access of the administrator from the client terminal 2.

A display state of a management screen for the administrator of the document management system 1000 according to the embodiment to manage the information stored in the document management apparatus 1 will be described with reference to FIG. 20 through FIG. 23. FIG. 20 is a diagram illustrating a state of individually displaying the partial images stored in the document information storing part 110 and the management information stored in the management information storing part 120 for each of the partial images. A screen as illustrated in FIG. 20 is displayed at the user I/F 201 of the client terminal 2 based on the display information generated in the application 202 of the client terminal 2. In detail, the information input/output 215 acquires the partial images stored in the document information storing part 110 and the management information stored in the management information storing part 120, from the document management apparatus 1. The document edit processing part 211 forms partial image information and the management information to display based on the information acquired by the information input/output part 213. The information display controlling part 213 generates and outputs display information to display the information formed by the document edit processing part 211. That is, the information display controlling part 213 functions as a copy relationship management information outputting part.

As illustrated in FIG. 20, in the state of individually displaying the partial images, thumbnails of the partial images stored in the document information storing part 110 are displayed by associating with information of image names, counters, and copy types, respectively. By displaying the screen as illustrated in FIG. 20, it is possible for a user to browse a list of copy relationships between counter values of the partial images and corresponding partial images.

FIG. 21 illustrates a state of the related image aggregation in which the partial images stored in the document information storing part 110 and the management information stored in the management information storing part 120 is displayed for each of the partial images which are copied from partial images included in the same one original, that is, to which the same copy ID is assigned for each of the partial images. In other words, the state of the related image aggregation illustrated in FIG. 21 can be a total display for each copy ID. As illustrated in FIG. 21, in this display state of the related image aggregation, a details button 21a is additionally displayed as a details display instructing part to display details for each of corresponding related images, in addition to the state of the individual display illustrated in FIG. 20. Moreover, a display portion for the image name displays the image name of the partial image having the copy type indicating "ORIGINAL" and also displays a count of the partial images having the same copy ID. By this display state as illustrated in FIG. 21, it is possible to easily comprehend an output count indicated by a total count of the partial images to which the same copy ID is assigned. Furthermore, it is possible to display a list of the partial images being original and stored in the document information storing part 110.

FIG. 22 illustrates a state of the details display in FIG. 22 in a case of displaying details when the details display instructing part displayed as the details button 21a is operated in the display state of the related image aggregation illustrated in FIG. 21. An operation applied to the details display instructing part means a click conducted by a mouse pointer, for example. As illustrated in FIG. 22, in the state of the details display, display items are the same as the state of the related image aggregation. In the state of the details display illustrated in FIG. 22, only the partial images associated to the details button which is operated in FIG. 21 and images related to the partial images are displayed. That is, in the state of the details display illustrated in FIG. 22, only the partial images having a copy ID which is the same copy ID associated with the details button 21a operated at the display of the related image aggregation in FIG. 21. By the details display as illustrated in FIG. 22, it is possible to display a list of the partial images associated with a selected copy ID, that is, the partial images having a copy relationship.

Figure 23:
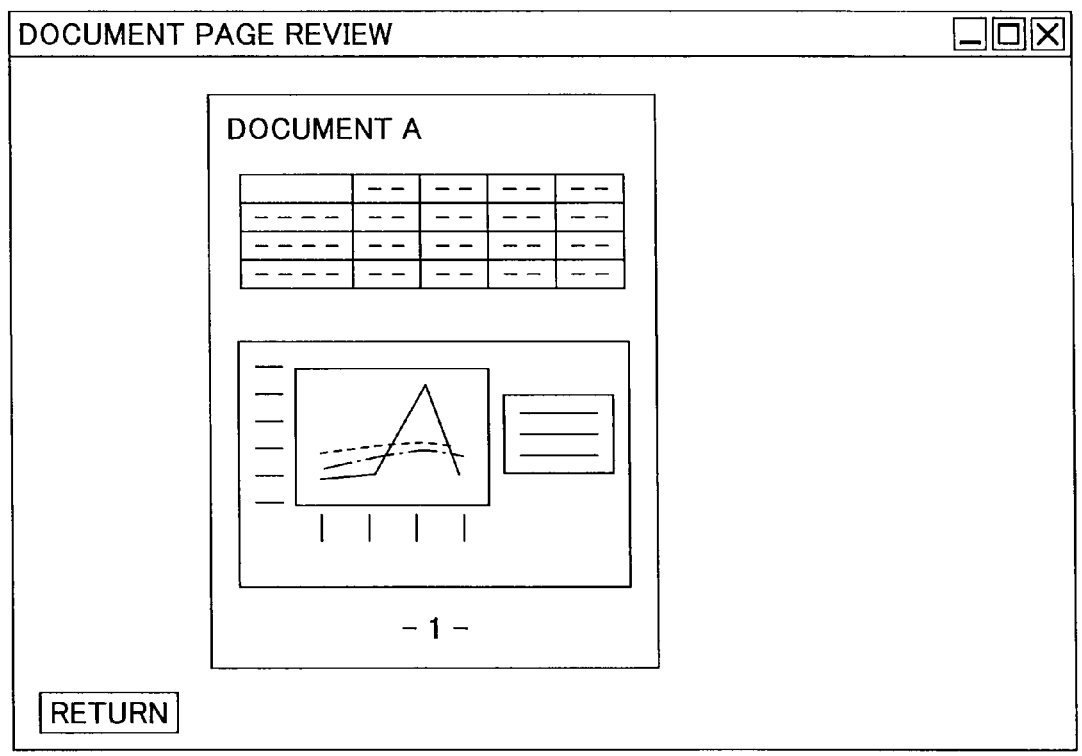
FIG. 23 is a diagram illustrating a display example concerning a preview display of a document according to the embodiment of the present invention.

FIG. 23 illustrates a screen is displayed when a thumbnail is selected at any one of displays illustrated in FIG. 20 through FIG. 22. For example, the thumbnail is selected by clicking a desired thumbnail image with the mouse pointer. The screen illustrated in FIG. 23 displays to preview a document page in which a page of a document including the partial image of the selected thumbnail is displayed. As described above, in any one of the display states illustrated in FIG. 20 through FIG. 22, by operating the thumbnail being displayed, it is possible to easily display the document including the partial image of the thumbnail.

As described above, in the document management system 1000 according to the embodiment, it is possible to preferably manage information which is used to form one document and is individually stored. In detail, it is possible to manage the copy relationship and the output count for each of the partial images stored as the information elements which are information forming one document.

In the embodiment, for example, as illustrated in FIG. 22, the same copy ID "0002" is assigned to the images A-1-2, B-2-4, C-4-8, and D-2-6. Accordingly, it is possible for the administrator of the document management system 1000 to comprehend a group of the partial images having the same partial image being original. The group is simply determined based on the same copy ID. Thus, the copy relationship cannot be directly recognized.

For example, in FIG. 22, when the counter indicates "0000" for partial images other than the image A-1-2 being original, and the counter indicates "0003" for the image A-1-2, the images B-2-4, C-4-8, and D-2-6 are determined as images which are copied from the image A-1-2 being original. As illustrated in FIG. 22, when the counter of the image A-1-2 indicates "0002" and the counter of the image B-2-4 indicates "0001", it is determined that the image B-2-4 is originated and copied from the image A-1-2. However, it is difficult to distinguish whether the copy originator of the images C-4-8 and D-2-6 is the image A-1-2 or the image B-2-4. In order to distinguish the copy originator, the information element ID of a parent image may be included in addition to the copy ID in the management information to be stored to the management information storing part 120. This management example will be described with reference to FIG. 24 and FIG. 25.

FIG. 24 illustrates another example including the information element ID of the parent image in the management information stored in the management information storing part 120, in addition to the copy ID. As illustrated in FIG. 24, IDs of the information elements, which are parent partial images as the copy originator images, are stored. By this management, it is possible for the administrator of the document management system 1000 to comprehend the copy relationship among the partial images in detail. Also, it is possible to display the copy relationship among the partial images in detail in the state of individually displaying the partial images illustrated in FIG. 20. This state will be described with reference to FIG. 25.

FIG. 25 illustrates a state of the individual display of the partial images in a case of storing information concerning the copy originator images of the partial images in the management information storing part 120. As illustrated in FIG. 25, the image names of the partial images being the copy originator and copy destination are displayed so as to recognize the copy relationship among the partial images. For example, referring to a display of the image name of the image B-2-4, "<-A-1-2" and "->D-2-6" are additionally provided. This display indicates that the partial image of the copy originator of the image B-2-4 is the image A-1-2 and the partial image copied from the image B-2-4 as the copy originator is the image D-2-6. By providing this display, it is possible for the administrator of the document management system 1000 to comprehend the copy relationship among the partial images in more detail.

According to the embodiment, as illustrated in FIG. 3, the application 202 is configured by operating the program loaded to the RAM 20 of the client terminal 2 in accordance with the control of the CPU 10. The program functioning as the application 202 may be stored in a recording medium such as the ROM 30, the HDD 40, or the like of the client terminal 2. Alternatively, the program may be stored in a recording medium of the document management apparatus 1. In a case of storing the program for functioning as the application 202 in the recording medium of the document management apparatus 1, when the user uses the document management system 1000 by operation the client terminal 2, the program for functioning as the application 202 is downloaded from the document management apparatus 1 to the client terminal 2 through the network.

Moreover, in the embodiment, the management information as illustrated in FIG. 9 is generated in the application 202 of the client terminal 2, and then, the instruction for storing information is input to the document management apparatus 1. However, contents processed in the client terminal 2 and contents processed in the document management apparatus 1 are not limited to the above-described examples. For example, it is possible to perform functions of the document edit processing part 211 and the management information processing part 214 at a side of the document management apparatus 1 as the function of the application 202. In this case, operation information which the user input through the user I/F 201 is sent from the client terminal 2 to the document management apparatus 1. Alternatively, functions of the document management controlling part 100 illustrated in FIG. 3 can be realized at a side of the client terminal 2.

Furthermore, in the embodiment, in the step S1102 in FIG. 11, when determining that the display area indicated in the management information input from the input/output controlling part 101 matches with the display area indicated in the management information input from the document information analyzing part 102, it is determined that the management information input from the document information analyzing part 102 is the management information of the partial image concerning a copy. That is, information of the display area is used as the information element specifying information. In addition, for example, when the application 202 conducts a copy of the partial image based on an operation of the user, a tentative ID may be generated for the copied partial image. In this case, the management information processing part 104 may use the tentative ID as the information element specifying information. In the following, details will be further described.

In addition to the information illustrated in FIG. 9, the application 202 includes the tentative ID in the management information and sends the instruction for storing information. Also, document information itself in which the partial image is copied includes the tentative ID. When extracting the partial image from the document information input from the input/output controlling part 101, the document information analyzing part 102 inputs the tentative ID assigned to the partial image to the management information processing part 104. The management information processing part 104 determines the management information of the partial image concerning the copy based on a result from matching the tentative ID included in the management information input from the input/output controlling part 101 with the tentative ID input from the document information analyzing part 102.

According to the above-described embodiment, it is possible to comprehend an execution situation such as a count of outputting image information and text information by downloading, printing, sending, or copying, and to comprehend a copy relationship of information being copied or edited.

Moreover, it is possible to preferably manage a plurality of sets of information which form one document and are individually being stored.

The present invention is not limited to the specifically disclosed embodiments, and variations and modifications may be made without departing from the scope of the invention.

The present application is based on the Japanese Priority Patent Application No. 2008-114156 filed Apr. 24, 2008, the entire contents of which are hereby incorporated by reference.

What is claimed is:

1. A document management apparatus for managing document information and information elements included in the document information, comprising:

a document storing instruction information acquiring part configured to acquire document storing instruction information which instructs to store a second document information including a second information element, which is generated by copying a first information element included in a first document information;

an information element acquiring part configured to acquire the second information element included in the second document information based on the acquired document storing instruction information;

an information element storing instruction part configured to instruct to store the second information element;

a copy originator information acquiring part configured to acquire copy originator information concerning the first information element which is included in the document storing instruction information and is a copy originator of the second information element;

an association information storing instruction part configured to instruct to store association information for associating the second information element with the first information element based on the acquired copy originator information;

a document information editing part configured to edit the second document information so as to copy and display the first information element included in the first document information as the second information element in the second document information;

a copy originator information generating part configured to generate information concerning the first information element as the copy originator information; and a document storing instruction part configured to send the document storing instruction information which instructs to store the edited second document information and includes the generated copy originator information.

2. The document management apparatus as claimed in claim 1, wherein said copy originator information acquiring part is configured to acquire first information element identification information for identifying said first information element as copy originator information; and said association information storing instruction part is configured to instruct to store copy relationship information by associating with a second information element identification information identifying the second information element, the copy relationship information being associated with first information element identification information in a copy relationship management information in which information element identification information identifying the information element is associated with the copy relationship information indicating a copy relationship of the information element, as the association information.

3. The document management apparatus as claimed in claim 1, wherein the copy originator information acquiring part is configured to acquire first information element identification information identifying the first identification element as the copy originator information; and said association information storing instruction part is configured to instruct to store the acquired first information element identification information by associating with second information element identification information identifying the second information element.

4. The document management apparatus as claimed in claim 1, further comprising an information element specifying information acquiring part configured to acquire information element specifying information which is included in the document storing instruction information and is for specifying the second information element,
   wherein said information element acquiring part is configured to acquire information element specifying information for specifying the second information element based on the acquired document storing instruction information; and
   said copy originator information acquiring part is configured to acquire the copy originator information included in the document storing instruction information as information concerning the first information element being a copy originator of the second information element, based on a correspondence between the information element specifying information acquired by the information element specifying information acquiring part and the information element specifying information acquired by the information element acquiring part.

5. The document management apparatus as claimed in claim 4, further comprising a display area information acquiring part configured to acquire display area information which is included in the document storing instruction information and indicates an area in which the second information element in the second document information is displayed,
   wherein the information element acquiring part is configured to acquire display area information indicating an area in which the second information element in the second document information is displayed, based on the acquired document storing instruction information, and
   said copy originator information acquiring part is configured to acquire the copy originator information included in the document storing instruction information as information concerning the first information element being the copy originator of the second information element, based on a correspondence between the display area information acquired by the display area information acquiring part and the display area information acquired by the information element acquiring part.

6. The document management apparatus as claimed in claim 1, wherein the document storing instruction information is configured to include copy situation information concerning a copy situation of the second information element, and
   said association information storing instruction part is configured to instruct to include the copy situation information in the association information and store the association information.

7. The document management apparatus as claimed in claim 1, further comprising an output count management information updating part configured to update output count management information associating output count information concerning a count of outputting the information element with the information element identification information identifying the information element,
   wherein said output count management information updating part is configured to update the output count information associated with the information element identification information identifying the first information element based on the copy originator information acquired by the copy originator information acquiring part.

8. The document management apparatus as claimed in claim 1, further comprising a copy relationship management information outputting part configured to acquire and output copy relationship management information associating the information element identification information identifying the information element with copy relationship information indicating a copy relationship of the information element,
   wherein said copy relationship management information outputting part is configured to associate information elements related to each other in a plurality of sets of the information elements through the copy relationship information, and to output the associated information elements.

9. The document management apparatus as claimed in claim 8, wherein said copy relationship management information outputting part is configured to output the copy relationship management information so as to display any one from a plurality of the information elements through the copy relationship information.

10. The document management apparatus as claimed in claim 9, wherein said copy relationship management information outputting part is configured to display the information element being the copy originator in the plurality of the information elements through the copy relationship information.

11. A document management method for managing document information and information elements included in the document information, comprising:
   acquiring document storing instruction information which instructs to store a second document information including a second information element, which is generated by copying a first information element included in a first document information;
   acquiring the second information element included in the second document information based on the acquired document storing instruction information;
   instructing to store the second information element;
   acquiring copy originator information concerning the first information element which is included in the document storing instruction information and is a copy originator of the second information element;
   instructing to store association information for associating the second information element with the first information element based on the acquired copy originator information;
   editing the second document information so as to copy and display the first information element included in the first document information as the second information element in the second document information;
   generating information concerning the first information element as the copy originator information; and
   sending the document storing instruction information which instructs to store the edited second document information and includes the generated copy originator information.

12. A non-transitory computer-readable recording medium recorded with a computer program for causing a computer to manage document information and information elements included in the document information, said computer program comprising codes for:
   acquiring document storing instruction information which instructs to store a second document information including a second information element, which is generated by copying a first information element included in a first document information;

acquiring the second information element included in the second document information based on the acquired document storing instruction information;
instructing to store the second information element;
acquiring copy originator information concerning the first information element which is included in the document storing instruction information and is a copy originator of the second information element;
instructing to store association information for associating the second information element with the first information element based on the acquired copy originator information;

editing the second document information so as to copy and display the first information element included in the first document information as the second information element in the second document information;
generating information concerning the first information element as the copy originator information; and
sending the document storing instruction information which instructs to store the edited second document information and includes the generated copy originator information.

* * * * *